United States Patent [19]

Tooley et al.

[11] Patent Number: 5,294,784
[45] Date of Patent: Mar. 15, 1994

[54] APPARATUS FOR SCANNING AND DOWNLOADING DATA

[75] Inventors: Thomas P. Tooley, Alpharetta; Andrew C. Zeik, Duluth, both of Ga.

[73] Assignee: NCR Corporation, Dayton, Ohio

[21] Appl. No.: 852,423

[22] Filed: Mar. 16, 1992

[51] Int. Cl.$^5$ .............................................. G08L 7/10
[52] U.S. Cl. .................................................. 235/462
[58] Field of Search ........................ 235/467, 472, 462

[56] References Cited

U.S. PATENT DOCUMENTS

| | | | |
|---|---|---|---|
| 3,902,048 | 8/1975 | Fleischer et al. | 235/467 |
| 4,019,026 | 4/1977 | Nakanishi et al. | 235/467 |
| 4,796,301 | 1/1989 | Uzawa et al. | 455/607 |
| 4,945,216 | 7/1990 | Tanabe et al. | 235/462 |
| 5,185,514 | 2/1993 | Wike, Jr. et al. | 235/462 |

Primary Examiner—Andrew M. Dolinar
Attorney, Agent, or Firm—Paul W. Martin

[57] ABSTRACT

An apparatus which is a single portable device for scanning and downloading data. The apparatus employs a laser within an optical scanner to accomplish both scanning and downloading functions. In addition to the optical scanner, the apparatus employs control and communication circuitry for switching from scanning to downloading and for modulating an outgoing laser beam during downloading. A modulating material, such as a liquid crystal display or electrochromic lens, is excited to modulate the outgoing laser beam passing through it. The optical scanner also includes a motor-driven mirrored spinner which may be stopped to accomplish a high rate of data transfer during downloading using a highly directional beam.

20 Claims, 2 Drawing Sheets

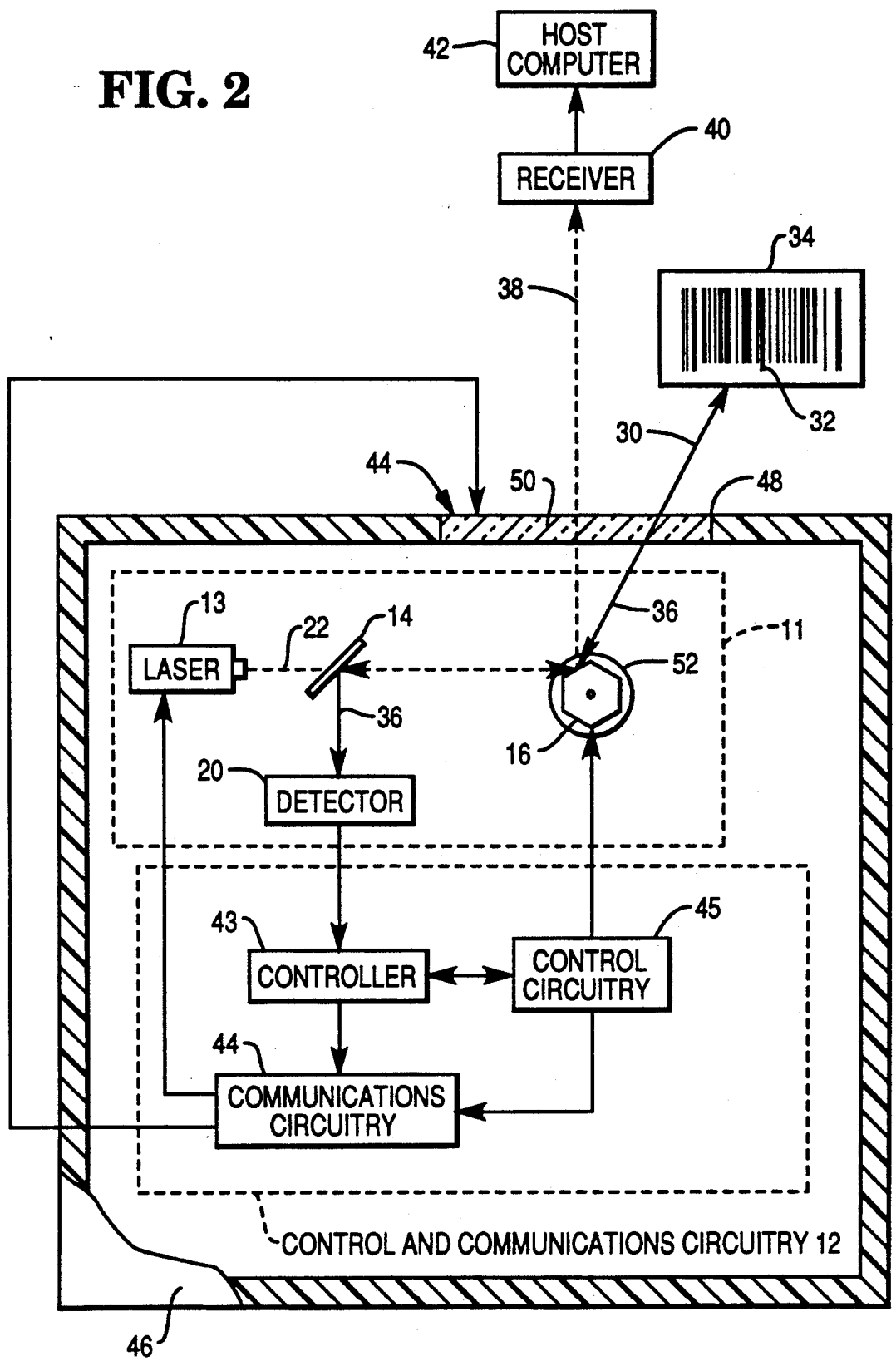

APPARATUS FOR SCANNING AND DOWNLOADING DATA

BACKGROUND OF THE INVENTION

The present invention relates to portable optical scanners and more specifically to an apparatus for scanning and downloading data, including bar code information.

Optical scanners are well known for their usefulness in retail checkout and inventory control. Optical scanners generally employ a laser diode, the light from which is focused and collimated to produce a scanning beam. A mirrored spinner directs the beam against a plurality of stationary mirrors, and a detector collects the beam after it is reflected by a bar code label. A motor rotates the spinner. The pattern produced by such a scanner is characterized by lines oriented at various angles to one another.

In a typical portable scanning environment, both gathering and data downloading must be performed. Data gathering is normally accomplished using a laser scanner. Data downloading to a host computer is normally accomplished through an RF transmitter or wired serial communications scheme. However, such methods of downloading data require additional communications circuitry, which adds weight and cost to portable scanning units.

Therefore, it would be desirable to provide a scanning apparatus which can download data without using an RF or wired serial communications module.

SUMMARY OF THE INVENTION

In accordance with the teachings of the present invention, an apparatus for scanning and downloading data, including bar code information is provided. The apparatus includes an optical scanner and control and communications circuitry.

The optical scanner includes a laser for producing an outgoing laser beam. A mirrored spinner reflects the beam. A motor rotates the mirrored spinner. An optical routing element employs a mirror for collecting light reflected from bar code labels and has an aperture through which the outgoing laser beam travels. A detector converts the reflected light into electrical signals based on the intensity of the reflected light.

The control and communications circuitry includes control circuitry for switching operation between scanning and downloading data, communications circuitry for modulating the outgoing laser beam with data, and a controller for processing and storing bar code information during scanning.

The switching circuitry deenergizes the motor to facilitate a high rate of data transfer through highly directional beams.

It is a feature of the present invention that scanning and data downloading functions are performed by a single portable device.

It is another feature of the present invention that the laser is used for both scanning and downloading of data.

It is accordingly an object of the present invention to provide an apparatus for scanning and downloading data.

It is another object of the present invention to provide an apparatus for scanning and downloading data which employs a laser within a scanner to both scan and download data.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a diagrammatic drawing of the apparatus of the present invention.

DETAILED DESCRIPTION OF THE PREFERRED EMBODIMENT

Figure 1:
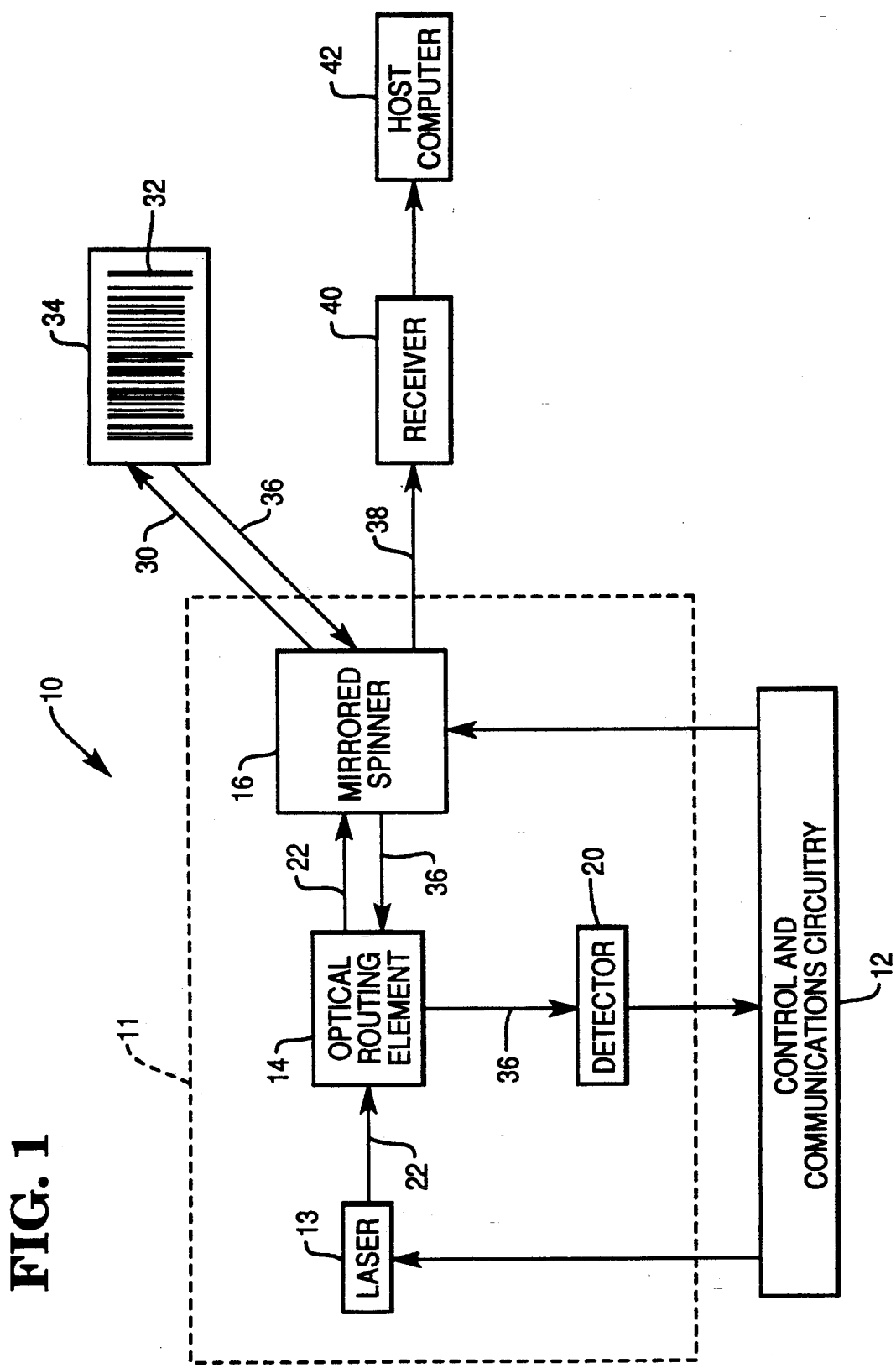
FIG. 1 is a block diagram of the apparatus of the present invention.

Referring now to FIGS. 1 and 2, apparatus 10 of the present invention includes optical scanner 11 and control and communications circuitry 12.

Optical scanner 11 includes laser 13, optical routing element 14, mirrored spinner 16, and photodetector 20. Laser 13 includes a laser diode, a focusing lens, and a collimating aperture.

Outgoing laser beam 22 passes through optical routing element 14, which includes a mirrored collecting surface and an aperture for passing beam 22.

Beam 22 contacts motor-driven mirrored spinner 16. Preferably, mirrored spinner 16 is a polygon having six mirrored facets for producing scan lines 30. The facets may be oriented at various elevation angles to achieve predetermined scan patterns. Scan lines 30 impact bar code label 32 of item 34 and the reflected light 36 is redirected by spinner 16 to optical routing element 14.

Optical routing element 14 directs reflected light 36 to photodetector 20, which generates signals representing the intensity of reflected light 36.

Control and communications circuitry 12 includes controller 43, communications circuitry 44, and control circuitry 45. Controller 43 processes and stores bar code information during scanning and controls the downloading process. Communications circuitry 44 modulates outgoing beam 22 with data. Control circuitry 45 selects between scanning and downloading operations. Downloading may include stopping spinner 16 from rotating to obtain a highly directional beam 38.

The present invention is particularly suited for inventory control, in which bar code information is scanned, stored, and downloaded to host computer 42 through receiver 40.

As shown in FIG. 2, apparatus 10 also includes a portable housing 46 containing optical scanner 11 and control and communications circuitry 12. Housing 46 includes aperture 48 through which scan lines 30 and reflected light 36 pass during scanning.

The present invention envisions many ways of modulating outgoing beam 38 during downloading. Modulation may be simply accomplished by turning laser 13 on and off in response to modulation signals from control and communications circuitry 12. When slow-reacting, high power laser diodes are employed, a higher data rate may be obtained by using modulating material 50, as part of communications circuitry 44, which may be either a liquid crystal or an electrochromic lens within aperture 48. Normally transparent modulating material 50 turns opaque upon receiving an electric potential from control and communications circuitry 12.

By deenergizing motor 52 and locking spinner 16 in place, downloading is limited to line-of-sight. When configured to download information, apparatus 10 may be placed in a docking station associated with host computer 42.

To reduce the directionality of outgoing beam 38 during downloading, spinner 16 may be set in motion to produce a scan pattern that would cover a larger area than a single beam. However, a slower data transfer rate would result.

Although the present invention has been described with particular reference to certain preferred embodiments thereof, variations and modifications of the present invention can be effected within the spirit and scope of the following claims.

What is claimed is:

1. An apparatus for scanning and downloading bar code data read from inventory items comprising:
   an optical scanner including a laser for producing an outgoing laser beam;
   switching means within the scanner for selecting between scanning bar codes on inventory items and downloading inventory item bar code data;
   modulating means within the scanner for modulating the outgoing laser beam with the inventory item bar code data during data downloading;
   control means within the scanner for processing and storing the inventory item bar code data, and for controlling operation of the scanner, the switching means, and the modulating means.

2. The apparatus as recited in claim 1, wherein the optical scanner further comprises:
   a mirrored spinner; and
   a motor coupled to the mirrored spinner which is controlled by the switching means.

3. The apparatus as recited in claim 2, wherein the mirrored spinner comprises a polygon having a predetermined number of mirrored facets.

4. The apparatus as recited in claim 3, wherein the number of mirrored facets comprises six.

5. The apparatus as recited in claim 2, wherein the optical scanner further comprises:
   an optical routing element, including a mirror for collecting light reflected from bar code labels during scanning, the mirror having an aperture through which the outgoing laser beam travels; and
   a detector for converting the reflected light into electrical signals based on the intensity of the reflected light.

6. The apparatus as recited in claim 1, wherein the modulating means comprises:
   a modulating material through which the outgoing laser beam passes; and
   means for exciting the modulating material with an electrical signal containing data to be downloaded.

7. The apparatus as recited in claim 6, wherein the modulating material comprises a liquid crystal display.

8. The apparatus as recited in claim 6, wherein the modulating material comprises an electrochromic lens.

9. The apparatus as recited in claim 1, wherein the modulating means comprises:
   means within the control means for turning the laser on and off.

10. The apparatus as recited in claim 2, wherein the switching means comprises:
    means within the scanner for deenergizing the motor.

11. The apparatus as recited in claim 1, wherein the scanner is portable.

12. An apparatus for scanning and downloading data comprising:
    an portable optical scanner including a laser for producing an outgoing laser beam, a mirrored spinner having a predetermined number of mirrored facets, a motor coupled to the mirrored spinner, a mirror for collecting light reflected from bar code labels during scanning, and a detector for converting the reflected light into electrical signals based on the intensity of the reflected light;
    switching means within the scanner for controlling the motor, including means for deenergizing the motor during data downloading;
    modulating means within the scanner for modulating the outgoing laser beam with data during data downloading including a modulating material through which the outgoing laser beam passes, and means for exciting the modulating material with an electrical signal containing the data to be downloaded; and
    control means within the scanner for processing and storing data, and for controlling operation of the scanner, the switching means, the modulating means, and the demodulating means.

13. A method for downloading inventory item bar code data from an optical scanner comprising the steps of:
    providing an optical scanner having a laser for producing an outgoing beam and a motor-driven mirrored spinner for reflecting the outgoing beam;
    switching operation of the scanner from scanning to downloading the inventory item bar code data; and
    modulating the outgoing laser beam with the inventory item bar code data to be downloaded.

14. The method as recited in claim 13, wherein the step of switching comprises the substep of:
    deenergizing the motor coupled to the spinner.

15. The method as recited in claim 13, wherein the step of modulating comprises the substeps of:
    providing a modulating material in the path of the outgoing laser beam; and
    exciting the modulating material with an electrical signal containing the data to be downloaded.

16. The method as recited in claim 13, wherein the step of modulating comprises the substep of:
    turning the laser on and off.

17. An apparatus for scanning and downloading inventory item bar code data comprising:
    an optical scanner including a laser for producing an outgoing laser beam;
    switching means within the scanner for selecting between scanning and downloading the inventory item bar code data;
    modulating means within the scanner for modulating the outgoing laser beam with the inventory item bar code data during downloading including a modulating material through which the outgoing laser beam passes, and means for exciting the modulating material with an electrical signal containing the inventory item bar code data to be downloaded; and
    control means within the scanner for processing and storing the inventory item bar code data, and for controlling operation of the scanner, the switching means, and the modulating means.

18. The apparatus as recited in claim 17, wherein the modulating material comprises a liquid crystal display.

19. The apparatus as recited in claim 17, wherein the modulating material comprises an electrochromic lens.

20. A method for downloading the inventory item bar code data from an optical scanner comprising the steps of:

providing an optical scanner having a laser for producing an outgoing beam and a motor-driven mirrored spinner for reflecting the outgoing beam;

switching operation of the scanner from scanning to downloading the inventory item bar code data; and modulating the outgoing laser beam with the inventory item bar code data to be downloaded by providing a modulating material in the path of the outgoing laser beam and exciting the modulating material with an electrical signal containing the inventory item bar code data to be downloaded.

* * * * *